May 18, 1937.  D. BASCH  2,081,047
CLAMP
Filed Dec. 10, 1929
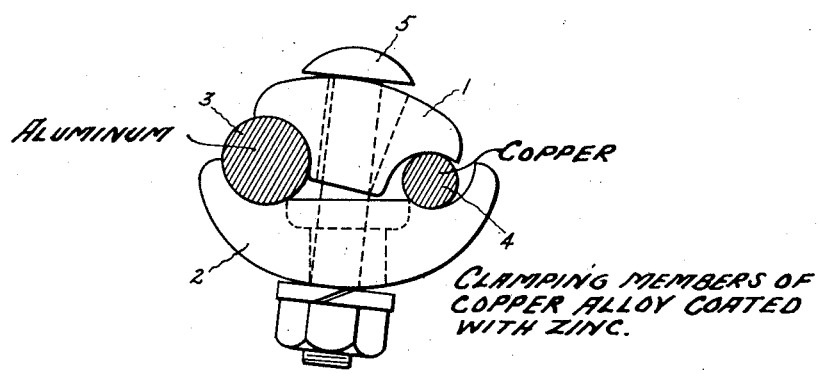
Inventor:
David Basch,
by Charles E. Mullen
His Attorney.

Patented May 18, 1937

2,081,047

UNITED STATES PATENT OFFICE 2,081,047

CLAMP

David Basch, Schenectady, N. Y., assignor to General Electric Company, a corporation of New York Application December 10, 1929, Serial No. 413,113

2 Claims. (Cl. 173—263)

This invention relates generally to clamps. It has special reference to the provision of metallic clamps for intimately uniting rods, wires and the like, which are of dissimilar composition and which are used as electrical conductors, which joints shall be strong and durable and not subject to oxidation or other corrosive agencies which result in the mechanical and/or electrical failure of the joint. The invention in its most specific aspect relates to the provision of a strong, durable, corrosion resisting connecting clamp between aluminum and copper conductors.

As is well known, there is a distinct problem in the uniting of electrical conductors of dissimilar metals such as copper and aluminum. Ordinary methods as now used, such as soldering, brazing or welding are expensive and uncertain. It is difficult to solder aluminum and copper. Such an operation requires a special solder and special technique and the result is that the operation is expensive. In addition, such a connection has not the requisite mechanical strength or permanency necessary for outdoor use. Another and more serious objection to the use of such a connection is that corrosion sets in resulting in the failure of the joint.

I have discovered that I can make an effective, mechanically strong, durable, and corrosion resisting metallic joint between aluminum and copper conductors which will be simple in its nature and inexpensive.

Referring to the accompanying drawing forming part of this application, the single figure there shown is a diagrammatic view in elevation of one form of metallic clamp between two electrical conductors of dissimilar composition which are shown in cross-section. It is to be understood that the exact mechanical form of the connection, or joint, is not limited to that shown in the figure but may be varied at will, provided only that it embodies the principles of my invention.

The form of clamp shown in the drawing comprises two clamping members 1 and 2 uniting the electrical conductors 3 and 4 by means of a simple bolt and nut arrangement 5. In carrying out my invention I construct the clamping members 1 and 2 of a copper alloy, such as brass or bronze. The clamping members are provided with a zinc surface or coated with another metal close to aluminum in the electrolytic series, such, for example, as cadmium. The coating may be provided in any known manner. The coated surfaces of the clamping members which clamp the conductors together come into intimate contact therewith. The conductor 3 may, for example, be the aluminum conductor and the conductor 4 the copper conductor. The clamping members may, for instance, be galvanized brass. Such a clamp would find extensive use, for example, where copper feeder cables are taken off from pure aluminum main transmission cables. In present construction clamping members comprising aluminum are employed for joining copper and aluminum conductors. The aluminum alloys which have heretofore been used for the clamping members are not mechanically as strong as copper alloys, such as brass or bronze, nor do they yield sufficiently under positive and deflective stresses to which such a clamp may be subjected, especially in outdoor use, and hence crack in use. Furthermore, unless a copper bushing is soldered to the aluminum clamping members coming in contact with the copper conductor, corrosion will set in, wear away the clamp and greatly increase its electrical resistance no matter how intimate the joint between the conductors is made.

In practice, if desired, after the clamping members have been provided with, for example, a zinc surface, the portions thereof which are to come in contact with the copper conductor may be reamed out so that the copper alloy surface will be exposed directly to the copper conductor. While it will be found that this gives excellent results, the reaming operation is not necessary, for in practice it is found that the clamping members without being subjected to this reaming operation also give an excellent joint.

The use of a metallic clamp as described has the following outstanding advantages. First, it prevents corrosion and maintains low electrical contact resistance. Second, the brass or bronze gives a mechanically strong metallic joint. Third, the construction is comparatively inexpensive.

What I claim as new and desire to secure by Letters Patent of the United States is:

1. In combination, a corrosion-resisting joint comprising aluminum and copper conductors and clamping members therefor, said clamping members being constructed of brass and provided with a zinc surface coating, said coating contacting with said conductors.

2. The combination with an aluminum conductor of a corrosion-resisting clamp, said clamp being constructed of brass and provided on its conductor contacting surface with a coating of zinc.

DAVID BASCH.